March 14, 1950     R. L. NILES     2,500,700

IMPLEMENT CARRYING APPARATUS

Filed Aug. 27, 1946

INVENTOR
Ray Lucius Niles
BY Clyde C. Balston
ATTORNEY

Patented Mar. 14, 1950

2,500,700

UNITED STATES PATENT OFFICE 2,500,700

IMPLEMENT CARRYING APPARATUS

Ray Lucius Niles, Crescent City, Fla.

Application August 27, 1946, Serial No. 693,211

2 Claims. (Cl. 214—75)

My invention has for its objects the manufacture of an apparatus for effectively elevating and transporting an implement or machine along highways, to prevent injury to the surface thereof; and comprises a relatively high, single, elongated, rigid hipped frame or body supported at its forward end or nose by and detachably coupled to a stiff draw bar horizontally hinged to said implement, with the fore-end of said draw bar hitched to a tractor or other motor vehicle— said frame being designed to provide a wide elongated open space below it, defined by the upper, parallel, flat plane part thereof, with its ends and sides free from obstructions, for the free reception and elevation in said open area of the implement and the level and steady conveyance thereof, which results I accomplish by means of appropriate mechanism comprising winding cables carried by the frame and designed to detachably connect with and to evenly elevate and hold the implement up to and adjacent the under, high, flat part of the frame, said cables, depending mainly from or adjacent the outer fore and aft high corners of the frame, and connecting preferably by hooks carried by said cables with or adjacent to the corresponding outer fore and aft corners or parts (or shaft ends) of the implement; the overall width of the frame, including its mechanism and the rearwardly disposed supporting wheels of the frame being so devised and disposed as to be not wider apart from side to side than the overall width of the widest standard types of implements allowed unmolested travel along the highways without obligation to first obtain special traffic permit therefor when conveying same, such as is required for an implement and/or conveying apparatus exceeding the standard overall legal width.

Figure 1:
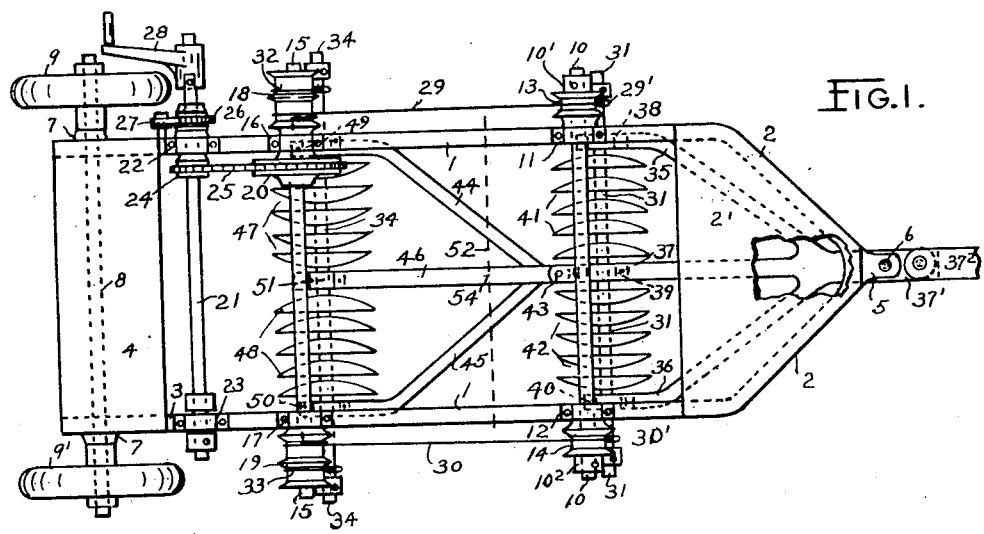

To clearly set forth said objects, reference is had to the accompanying drawings, in which:

Fig. 1 is a plan view of my apparatus, slightly broken away, illustrating such features and showing below it in diagram a conventional type of disk harrow (shown as of less than full overall standard width merely to avoid excessive fracture or confusion of over-lapping lines), and illustrates also a simple device to detachably connect said apparatus and harrow to a motor vehicle.

Figure 2:
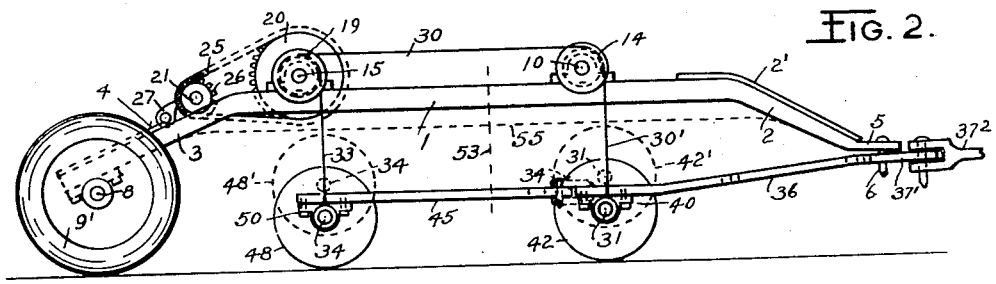

Fig. 2 is a side elevation of Fig. 1, showing the high, elongated, hipped and flat topped form of the frame with its single intact construction, and illustrates the harrow resting on the road surface, and in dotted lined circles below said frame the elevated position of said harrow (with its disks and shafts) as indicative of the position the harrow would occupy in transit well up under the upper flat portion of said frame; said harrow frame, merely for clearness of illustration, not being shown in elevated position. Said figure also shows the supporting wheels disposed beyond and well aft of the rear end of the harrow, and the unobstructed area occupied by the latter beneath the upper part of the frame.

Figure 3:
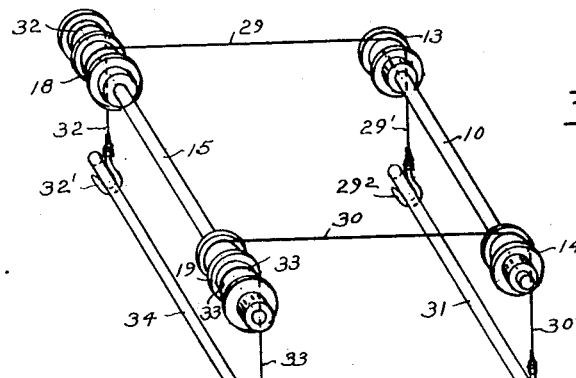

Fig. 3 is a geometric projection of the harrow hoisting or elevating mechanism comprising shafts, drums, pulleys or idlers, cables, and harrow disk shafts—said disks, for better clarity, being omitted therefrom, and the elevating mechanism (i. e. the shafts and cable drums and idlers) being shown somewhat elongated, and the harrow shafts shortened, the better to illustrate how the cable hooks are attached thereto.

Figure 4:
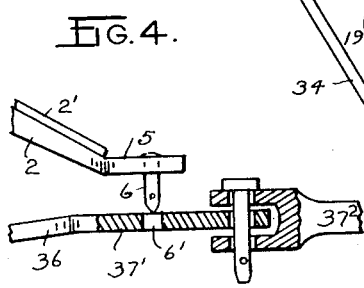

Fig. 4 is an enlarged fragmentary view, partly in section, showing connection of the fore end of my apparatus with the draw bar of the harrow, and connection with the hitch of a tractor or other motor vehicle.

In the specification the sides of the rigid horizontally disposed hipped single frame or body 1 of my apparatus, formed preferably of elongated approximately parallel members such as channel or angle iron, converge inwardly and are preferably deflected downwardly at its fore end as at 2 well forward of the fore end of a conveyed implement, with the rear end of said frame deflected downwardly as at 3 well aft of the rear end of such implement, thereby forming the open unobstructed area of my hipped type of frame; the forward end thereof having preferably a brace plate 2' shaped and welded to the top thereof. To the rear frame part 3 is similarly attached a brace plate 4 to give lateral rigidity to the deflected part of said frame. Other conventional cross, diagonal, or suitable braces may be attached to the upper or end portions of said frame to hold it parallel and rigid, to off-set torsional or longitudinal stress, in such manner as not to obstruct the open area beneath said hipped frame; it being noted that in this type of apparatus, no centrally disposed shaft braces or wheels close or obstruct any part of said area, either below the frame or outside of the parallel sides thereof.

The side members 1, 1 of the frame may be disposed as generally shown parallel to each other, or they may gradually converge from the rear to the fore end of the apparatus, to give a gradually narrowing width thereto.

The aforesaid forward ends of the frame 2, 2 are intended to be welded together and end in the short projecting nose 5, depending from which is a pin 6 secured rigidly thereto, which pin is adapted in turn preferably by means of a hole 6' to detachably engage the fore end of the harrow draw bar 37 as at 37', which draw bar engages in conventional manner a hitch 37² of a tractor or automobile.

To the wide rear end of said frame at 7, 7 is attached a shaft or axle 8 to which are journaled the frame supporting wheels 9, 9', which wheels are disposed at or near each side or rear corner of the frame, well behind and clear of the rear end of a conveyable implement, the extreme overall width of the sides of the frame, its braces, wheels, and its winding mechanism being so disposed and apportioned as not to exceed the legal width allowable for usual free travel of such vehicles when being transported along highways. Said shaft, it will be readily understood, may not extend as shown across said frame but may be comprised of conventional type separate spindles (not so shown) upon which the wheels could be mounted, which wheels it will be readily understood may be positioned either on the outside or on the inside of the deflected rear part of the frame members 3, in which latter case the brace plate 4 may be removed or placed in different position on the frame in order to accommodate said wheels in said inner position.

It will be readily understood that other types of harrows or machines may be substituted for that shown in the drawings, as long as they may be effectively hoisted, retained and conveyed by my apparatus well above and along roadways, after the manner set forth herein; also, that the hoisting and retaining cables depending from adjacent the upper fore and aft corners of the frame, may connect adjacent the respective corresponding fore and aft corners of the implement frame or frames or adjacent the outer ends of the shafts of the implement.

A shaft 10 is secured at 11 and 12 in any suitable manner to the frame 1. At the outer ends of said shaft 10 are journaled idler pulleys 13 and 14, which idlers may be retained thereon by any efficient means, such as by the conventional collars 10', 10². Another shaft 15, rearwardly disposed on said frame, is turnably secured thereto at 16, 17, to which shaft 15, cable winding drums 18, 19 are rigidly fastened in any suitable manner, and are adapted to turn with said shaft—said shaft 15 being laterally positioned on said frame, as shown in Figs. 1 and 2. Another shaft 21 is journaled on said frame at 22, 23, preferably rearwardly of the shaft 15, and a gear or sprocket wheel 20 is keyed or otherwise secured to the shaft 15. A smaller gear or sprocket 24 is secured to shaft 21, having a sprocket chain, indicated at 25, connecting said sprockets. At 26 a rachet wheel is secured to said shaft 21, and adjacent thereto on said frame is journaled a pawl 27 in any efficient manner, to lock said rachet wheel 26 and shaft 21 and thereby shaft 15 and its aforesaid cable drums in any position to which they may be revolved by a hand operated crank 28 preferably detachably carried by the end of said shaft 21.

The turning mechanism for the cable drums on said shaft 15 may, instead of the aforesaid sprocket wheels and chain, consist of gears so located with their respective shafts on the frame, that they may be meshed together in the usual manner to turn the shaft 15 and its cable winding drums 18, 19.

To said drums on the opposite ends of shaft 15 are securely attached by any efficient means cables or chains 29, 30 (it being understood that both sides of my apparatus are equipped with similar drums, idlers, and hoist cables or chains) which cables 29 and 30 pass forwardly respectively over the idlers 13 and 14 and depend therefrom as at 29' and 30'; the lower ends of each respective cable having attached thereto, by any efficient means, hooks 29², 30², (representative of any other type of efficient conventional catch means) to detachably engage the ends of the harrow shaft 31. The shorter cables 32, 33 are also attached respectively to the cable drums 18, 19, and depend therefrom as shown in Fig. 3, each terminating at their lower ends in like hooks or catches 32', 33', adapted to engage the ends of the harrow shaft 34.

The forwardly disposed harrow shaft 31 is attached in any suitable manner to the rear end of the harrow forward frame members 35, 36, 37, as indicated by the dotted line journals or retainers 38, 39, and 40, the part 37 and 37' thereof at its forward end representing the forward draw bar of said harrow.

To the shaft 31, (which may be of the single or conventional jointed type) are fitted in the usual way harrow disks 41, 42, and to the draw bar member 37 at 43 is connected rigidly or movably as desired, a rear harrow frame comprised similarly of parts 44, 45 and 46, to the rear ends of which frame is journaled or otherwise attached the shaft 34, having disks 47, and 48, said journals (or clamps) being indicated at 49, 50 and 51. Since certain types of harrows have an outer frame, instead of the aforesaid cables or chains connecting with the harrow shafts, it will be readily understood that they may be connected by any suitable devices with the harrow frame.

Another shaft with idler and cable or chain similar to the assembly of shaft 10 (but with the idler, similar to that of 13, disposed at the center of said shaft—said assembly not being illustrated) may be journaled or fastened to the frame 1, 1 athwart same, between shafts 10 and 15; the relative position of said shaft, idler, and cable being indicated by the dotted horizontal line 52 and the vertical line 53, at about the intersection of which such idler and its cable would be positioned; and in relation thereto a single cable drum formed like idler 13 or 14 (but likewise not illustrated) may be centrally disposed on and securely attached to the shaft 15, to which drum a cable or chain, similar to 29, 29' and hook 29², may be attached and be so disposed as to be able to engage and hoist the central part of the harrow frame, at 54.

A longitudinal brace plate, the position of which is indicated by the dotted line 55, may be welded to each side of the frame 1, 1 to give greater supporting strength thereto.

It is to be understood that the wheels, rollers, pulleys and the ends of the shafts illustrated for clarity outside of the frame sides of the apparatus, may all be positioned within said frame sides.

To operate my apparatus (as illustrated, for example, with a disk harrow) the draw bar of the harrow is first put in position behind and hitched to the tractor, after which said apparatus is lined up at the rear of the aligned harrow with the nose of the apparatus elevated thereabove and the apparatus then drawn forwardly over the harrow until the nose 5 thereof bears on the harrow draw bar at 37' and the coupling or hitch pin 6 of the nose 5 of the frame of the apparatus is entered into a hole in the fore end of the harrow draw bar at 37', (in which position my apparatus is thereby easily positioned or superimposed over the harrow); whereat the hooks 29², 30², 32' and 33' are then connected with their respective or adjacent harrow shafts (or with adjacent parts of the harrow frame). Thereafter, by turning the crank 28 and thereby shaft 21 and the small sprocket 20, and through the sprocket chain 25 the larger sprocket 20, the shaft 15 will be revolved and wind up the four cables on the drums 18 and 19 and thereby raise the harrow (or other agricultural implement), and by means of the retaining rachet wheel 26 on the shaft 21, and the pawl 27 engaging said rachet, hold the harrow, etc., in elevated position under the frame or body of said apparatus, as indicated by the dotted line positions of the harrow disks 42 and 48, respectively at 42' and 48', for safe conveyance over road surfaces.

It will be understood, of course, that the harrow frame (Fig. 2) will be likewise elevated, together with the shafts and disks thereof, but for the purpose of merely avoiding overlapping lines and confusion in the drawings, the harrow frame is not shown in such elevated position.

I do not, of course, limit myself to the transverse direction and positions of the shafts, cable drums, idlers, cables, etc., since they may be disposed fore and aft on the frame of the apparatus; and the gears, etc., for operating the hoisting device may be also similarly disposed; and if desired, the crank 28 may be directly attached to the cable winding shaft 15, also the rachet wheel and pawl be connected directly therewith, and the sprocket wheels or gears be dispensed with.

The term frame, structure, or body, comprises any suitable and efficient rigid mobile elongated, hipped frame with spaced supporting wheels disposed at the after end thereof, intended to be superimposed upon or over, and to elevate, hold and convey thereunder and along a roadway, any type of harrow or agricultural implement or machine suitable for conveyance by my apparatus.

The term harrow or disk harrow or agricultural implement or machine is intended to cover any type thereof capable of doing injury to a road surface when moving thereon, that may be raised therefrom and retained in such position, during conveyance by my apparatus.

The term cables covers also chains or other usable flexible elevating and retaining means.

The term rotatable members covers besides the cable drums also the use of idlers to which cables are not connected but pass over and depend therefrom.

The expression adjacent the fore and aft corners of the frame of said implement, or equivalent wording, covers also the outer ends or near ends of the fore and aft disposed shafts thereof.

What I therefore claim is.

1. In a tractor drawn implement-conveying apparatus comprising a high elongated frame having approximately parallel side members spaced relatively widely apart and having the fore ends of said frame disposed inwardly toward each other approximately on a line projected longitudinally through the fore and aft axial center of said frame, and said fore end of said frame constituting thereby a nose thereof, and the rear end of said frame being deflected rearwardly and supported by wheels, the area below the upper and between the fore and aft parts of said frame being free from obstructions and being unobstructed by said wheels, and said frame having spaced depending cables and means whereby their free ends connect with said implement, and mechanism carried by said frame to wind said cables to elevate said implement and retain it in elevated position thereunder and with relation to said frame, said implement having a stiff draw bar hinged thereto in approximately horizontal plane and extending forward therefrom and connecting by trailer hitch to said tractor, the nose of said frame bearing on and being supported by said draw bar and being detachably coupled thereto adjacent the fore part thereof, whereby said implement draw bar supports and securely holds the fore end of the frame of said conveying apparatus and co-incidentally conveys same and said elevated implement in fixed fore and aft alignment.

2. A device as defined in claim 1, wherein a coupling is provided for connecting said frame nose part and said implement draw bar part, said coupling comprising an approximately perpendicularly disposed member rigidly secured to one of said parts and adapted to project and fit freely into a hole formed in the other of said parts, thereby coupling together the fore part of said conveying frame and said draw bar, the weight of much of said frame and the supported implement suspended thereby causing the nose of said frame to bear down firmly on said draw bar and remain in contact therewith during transit of said machine.

RAY LUCIUS NILES.

REFERENCES CITED

The following references are of record in the file of this patent:

UNITED STATES PATENTS

| Number | Name | Date |
| --- | --- | --- |
| 746,146 | Perry | Dec. 8, 1903 |
| 1,531,180 | Erickson | Mar. 24, 1925 |
| 1,609,625 | Lawes | Dec. 7, 1926 |
| 2,164,550 | Steward | July 4, 1939 |
| 2,398,147 | McKay | Apr. 9, 1946 |
| 2,448,443 | Krake | Aug. 31, 1948 |
| 2,454,675 | Showalter | Nov. 23, 1948 |